US010650706B2

(12) United States Patent
Barnhardt et al.

(10) Patent No.: US 10,650,706 B2
(45) Date of Patent: *May 12, 2020

(54) PRESSURE-SENSITIVE LABEL

(71) Applicant: Multi-Color Corporation, Batavia, OH (US)

(72) Inventors: Douglas Barnhardt, West Chester, OH (US); Barron G. McKillip, Batavia, OH (US); Stephen Riccardi, York, PA (US); Floyd Needham, Loveland, OH (US); A. Craig Bushman, Loveland, OH (US)

(73) Assignee: Multi-Color Corporation, Batavia, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,943

(22) Filed: Feb. 7, 2019

(65) Prior Publication Data
US 2019/0172374 A1    Jun. 6, 2019

Related U.S. Application Data

(63) Continuation of application No. 15/094,443, filed on Apr. 8, 2016, now Pat. No. 10,325,528, which is a continuation-in-part of application No. 14/724,021, filed on May 28, 2015, now abandoned.

(51) Int. Cl.
| *G09F 3/10* | (2006.01) |
| *B32B 7/06* | (2019.01) |
| *B32B 7/12* | (2006.01) |
| *B32B 27/08* | (2006.01) |
| *B32B 27/10* | (2006.01) |
| *B32B 27/30* | (2006.01) |
| *B32B 27/32* | (2006.01) |
| *B32B 27/36* | (2006.01) |
| *B32B 27/38* | (2006.01) |
| *B32B 27/40* | (2006.01) |
| *B32B 27/16* | (2006.01) |
| *G09F 3/02* | (2006.01) |

(52) U.S. Cl.
CPC .................. *G09F 3/10* (2013.01); *B32B 7/06* (2013.01); *B32B 7/12* (2013.01); *B32B 27/08* (2013.01); *B32B 27/10* (2013.01); *B32B 27/16* (2013.01); *B32B 27/30* (2013.01); *B32B 27/308* (2013.01); *B32B 27/32* (2013.01); *B32B 27/36* (2013.01); *B32B 27/38* (2013.01); *B32B 27/40* (2013.01); *B32B 2250/242* (2013.01); *B32B 2307/4023* (2013.01); *B32B 2307/748* (2013.01); *B32B 2307/75* (2013.01); *B32B 2405/00* (2013.01); *B32B 2519/00* (2013.01); *G09F 2003/0202* (2013.01); *G09F 2003/023* (2013.01); *G09F 2003/0225* (2013.01); *G09F 2003/0257* (2013.01)

(58) Field of Classification Search
None
See application file for complete search history.

(56) References Cited

U.S. PATENT DOCUMENTS

| 4,180,929 | A | 1/1980 | Schultz, Jr. |
| 5,013,631 | A | 5/1991 | Su |
| 5,089,336 | A | 2/1992 | Kumar et al. |
| 5,587,405 | A | 12/1996 | Tanaka et al. |
| 6,210,524 | B1 | 4/2001 | Josephy |
| 6,228,486 | B1 | 5/2001 | Kittel et al. |
| 6,270,871 | B1 | 8/2001 | Scholz et al. |
| 6,461,707 | B1 | 10/2002 | Scholz et al. |
| 6,562,402 | B2 | 5/2003 | Scholz et al. |
| 6,773,653 | B2 | 8/2004 | Miller et al. |
| 6,890,400 | B2 | 5/2005 | Scholz et al. |
| 2002/0015828 | A1 | 2/2002 | Ast |
| 2007/0080234 | A1* | 4/2007 | Domoy ............ G06K 19/06037 235/494 |
| 2007/0082963 | A1 | 4/2007 | Bhatt |
| 2008/0138550 | A1 | 6/2008 | Takahashi et al. |
| 2011/0189477 | A1* | 8/2011 | Miracle .................... B32B 7/06 428/349 |
| 2011/0289647 | A1 | 12/2011 | Chiao et al. |
| 2015/0266606 | A1 | 9/2015 | Wiegers et al. |

(Continued)

FOREIGN PATENT DOCUMENTS

| WO | 9954860 A1 | 10/1999 |
| WO | 02055295 A1 | 7/2002 |

(Continued)

OTHER PUBLICATIONS

Definition of "film" from Merriam Webster dictionary, retrieved on May 21, 2018.
Definition of "silicone" from Merriam Webster dictionary, retrieved on May 22, 2018.
International Search Report in International Patent Application No. PCT/US2016/034596, dated Sep. 14, 2016, 5 pgs.
Office Action in U.S. Appl. No. 14/724,021, dated Feb. 14, 2017, 18 pgs.
Office Action in U.S. Appl. No. 15/094,443 dated Sep. 28, 2017, 22 pgs.
Office Action in U.S. Appl. No. 15/094,443, dated Mar. 15, 2017, 19 pgs.

(Continued)

*Primary Examiner* — Anish P Desai
(74) *Attorney, Agent, or Firm* — Wood Herron & Evans LLP

(57) ABSTRACT

A pressure sensitive label and method for preparing same, the pressure sensitive label comprising: (a) a support portion, the support portion including at least a carrier layer; and (b) a transfer portion over the support portion for transfer of the transfer portion from the support portion to an article upon application of pressure to the transfer portion while the transfer portion is in contact with the article, the transfer portion including at least a printable layer in confronting relationship with the carrier layer, and an ink layer positioned between the printable layer and carrier layer.

12 Claims, 5 Drawing Sheets

(56) References Cited

U.S. PATENT DOCUMENTS

2016/0335927 A1 11/2016 Lux et al.
2016/0351082 A1 12/2016 Barnhardt et al.
2016/0351083 A1 12/2016 Barnhardt et al.

FOREIGN PATENT DOCUMENTS

WO    2010076807 A1    7/2010
WO    2011150000 A2   12/2011
WO    2016191663 A1   12/2016

OTHER PUBLICATIONS

Office Action in U.S. Appl. No. 15/094,443, dated May 25, 2018, 21 pgs.
Written Opinion in in International Patent Application No. PCT/US2016/034596, dated Sep. 14, 2016, 8 pgs.

* cited by examiner

PRESSURE-SENSITIVE LABEL

CROSS-REFERENCE TO RELATED APPLICATIONS

This application is a continuation of U.S. patent application Ser. No. 15/094,443, entitled "Pressure-Sensitive Label," filed Apr. 8, 2016, which is a continuation-in-part of U.S. patent application Ser. No. 14/724,021, entitled "Pressure-Sensitive Label," filed May 28, 2015, the disclosures of which are incorporated by reference herein in their entireties.

FIELD OF THE INVENTION

The present invention relates generally to labels for various articles, and relates more specifically to pressure sensitive labels for articles, such as containers.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Pressure sensitive labels are multi-layered constructions that include a pressure-sensitive adhesive, and are used to label articles by applying pressure to the label when it is in contact with an article to adhere the label to the article via the pressure-sensitive adhesive. Such pressure sensitive labels are popular because, among other characteristics, they are versatile, and allow for a high level of printability with bright colors printed on surfaces. Further, they can be printed onto a large spectrum of materials such as paper, foil, metal, plastic, and other synthetic materials. They are also compatible with a wide array of finishing processes, including (but not limited to) perforating, embossing, and hot stamping.

Referring to FIG. 1, a typical prior art pressure sensitive label 1 is shown. When labeling an article with a pressure sensitive label, one generally acquires a base pressure sensitive label stock 2 from a separate supplier. The base pressure sensitive label stock 2 usually includes at least four laminated layers: (1) a carrier 3 (sometimes referred to as a "liner"), (2) a release layer 4 disposed onto one surface of the carrier, (3) an adhesive layer 5 (including a pressure-sensitive adhesive) disposed onto the release layer, and (4) a face stock 6 disposed onto the adhesive layer.

The typical base pressure sensitive label stock 2 can thus be thought of as having a support portion 7 (carrier 3 and release layer 4) and a transfer portion 8 (adhesive 5 and face stock 6). The release layer 4 is used to allow the portion that will transfer to an article to peel away and release from the carrier 3 during label application.

The face stock 6 is typically made from a web or sheet of paper, film, or foil, and is applied or laminated to the adhesive layer 5 sequentially at some time after the adhesive layer 5 has been laid down. Once the base pressure sensitive label stock 2 is acquired from a supplier, the face stock 6 may then be printed on with an ink layer 9 or layers (text, graphics, indicia, etc.) to create the label decoration and information. The conventional pressure sensitive label construction is then applied to an article surface by removing the carrier 3 and release layer 4 to expose the adhesive layer 5 and placing the adhesive layer 5 into contact with the desired surface and applying pressure, to transfer the adhesive 5, face stock 6, and ink layer 9 to the article (the "ink layer" as described herein may include more than one ink to create the appearance of the label decoration and information).

While these pressure sensitive labels are well known, there are many drawbacks to the use of the above-described pressure-sensitive labels. As described above, the initial base pressure sensitive label stock (carrier, release layer, adhesive layer, and face stock) is generally provided by a third party with the label design (i.e., ink graphics, text, indicia, etc) being added thereafter. This does not allow for the construction of an entire label (e.g., carrier, release layer, adhesive layer, face stock, and ink layer) at one location and/or time. And so, present pressure sensitive labels require a multi-location, multi-step process for their production, thereby lengthening the amount of time needed to manufacture a completed pressure sensitive label. (When the "construction of a label," or the like, is referenced herein, it is intended to refer to both the construction of an individual label and/or to the construction of a web of multiple individual labels.)

Further, the supplier of the base pressure sensitive label stock does not know ahead of time what size shape, contour, etc. of ink layer indicia will be printed on the base stock to create the final web of labels (the "web of labels" being a length of base pressure sensitive label stock with multiple individual labels printed via ink/indicia along its length). Thus, the base pressure sensitive label stock is created with a flood coating of adhesive and a face stock that matches or generally closely matches the area of the carrier (to accommodate any size, shape, contour, etc. of ink layer or layers that may be printed, and any size, shape, and/or contour of label or labels). Because of this, following printing of the ink design, the web of labels must be die cut to produce the final web (carrier/release with individually cut labels thereon). This process requires that the carrier be made of a strong material—such as a polyester—so that it can withstand the die cut process without being cut itself (as only the ink layer, face stock, adhesive, and release gets cut). The cut matrix that does not include labels is then removed and discarded. The use of the strong material (e.g., polyester) of the carrier presents the problem that the carrier cannot be recycled, as the material cannot be placed into the recycle stream for label web materials. While the carrier is commonly polyester, that does not prevent the use of other materials for the carrier (such as a paper liner, glassine, polypropylene, or blends of such materials).

Further, because the base pressure sensitive label stock needs to be provided by a third party with printing of the ink layer occurring thereafter, it is required that the layers of the final label be ordered in such manner that the adhesive is proximal to the carrier (e.g., adjacent to the release layer) with the ink disposed distal from the carrier. This configuration results in further drawbacks to the pressure sensitive labels of the prior art. First, the fact that the adhesive is proximal to the carrier requires a release layer or coating between the carrier and the adhesive to allow the adhesive, face stock, and ink layer to release from the carrier during application to an article. The need for this release layer adds materials, and thus cost, to these conventional pressure sensitive labels. Second, the positioning of the ink layer distal to the carrier means that the ink layer will be the outer surface of the label once it is applied to an article. This means that the ink layer can be easily scuffed or damaged—disrupting the aesthetic appearance of the article. This also means that metallics cannot be used as inks in these conventional pressure-sensitive labels (due to their ease of damage). Thus, the inks that can be used in these labels are limited, and the designs are subject to damage. One could add a protective layer to the label (to the outside of the ink layer) but, like the release layer described above, this adds yet another layer, and cost, to the label.

Further, where the label is to be adhered to a contoured or irregular surface, and where a high degree of flexibility is desired, the rigidity of the face stock (and any rigidity due to the multiple layers of the label) may interfere with the application and the adherence of the label.

Further still, one common occurrence in the application of a pressure sensitive label is to have various defects, such as wrinkles and blisters. These defects occur when the label becomes misaligned to the article to which it is applied, and/or entrapment of air between the label and the article. The result is less than optimum visual appeal (poor aesthetics), label failure due to scuffing or tearing of the unsupported label, or even unsellable products.

In view of many of the drawbacks of pressure sensitive labels, as described above, (particularly the many layers that are needed, the use of a third party base construction, and the damage that can occur to the label indicia), many have often turned to heat transfer labels as an alternative type label. Heat transfer labels are desirably resistant to abrasion and chemical effects in order to avoid a loss of label information and desirably possess good characteristics of adhesion to the articles to which they are affixed.

Heat transfer labels are multilayered constructions, with each layer having its own function. For example, heat transfer labels generally include an adhesive layer, an ink layer, and a release layer. The release layer may be a wax release layer, and is often directly adjacent a carrier sheet, such as on a roll or web of labels. Thus, in such an example, the label may be thought to include a "support portion" (e.g., carrier sheet and release layer and a "transfer portion" (i.e., ink layer and adhesive layer). When subjected to heat, the wax release layer melts, thereby allowing the transfer portion to be separated from the carrier sheet, and the adhesive layer adheres the ink layer to an article being labeled. Alternatively, all or part of the wax release layer may transfer as well, to provide protection to the ink layer. Additionally or alternatively, the labels may include a separate protective layer overlying the ink layer to protect the ink layer from abrasion.

More specifically, in the heat transfer labeling process, the label-carrying sheet is subjected to heat, and the label is pressed onto an article with the ink layer making direct contact with the article. As the paper sheet is subjected to heat, the wax layer begins to melt so that the paper sheet can be released from the ink layer. (And, as described above, a portion of the wax layer may be transferred with the ink layer and a portion of the wax layer may remain with the paper sheet.) After transfer of the ink layer to the article, the paper sheet is removed, leaving the ink layer firmly affixed to the article. In an alternate embodiment, where the wax layer also transfers, the wax layer thus may serve two purposes: (1) to provide release of the ink layer from the sheet upon application of heat to the sheet, and (2) to form a protective layer over the transferred ink layer. After transfer of the label to the article, the transferred wax release layer may be subjected to a postflaming technique which enhances the optical clarity of the layer (thereby enabling the ink layer therebeneath to be better observed) and which enhances the protective properties of the transferred wax layer.

However, the primary drawback to the use of the heat transfer label is the requirement of heat to be applied during the labeling process, which may not be desirable. It is, therefore, desirable that a pressure sensitive label construction be constructed for use as a label, for example, which avoids the need to use a conventional face stock formed from paper, film, or foil. It is further desirable that the pressure sensitive label construction have printability, convertibility and dispensability properties that are better than or equal to that of pressure sensitive label constructions of the prior art (as described above). It is also desirable that such a pressure sensitive label construction be designed in a manner that reduces the amount of manufacturing time needed to complete same, when compared to a pressure sensitive construction of the prior art. Further, it would be desirable to reduce and/or eliminate wrinkles and/or blisters that may form during label application. Further, it would be desirable for such a pressure sensitive label construction to have reduced layers, and thus cost, increase recyclability, increase ease of application to an article being labeled, and reduce the incidence or likelihood of damage to the ink layer.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

Various aspects of the present invention address any and/or all of the drawbacks described above with pressure sensitive labels of the prior art by providing pressure sensitive labels that, among other characteristics, have reduced layers, reduced cost, increased recyclability, increased ease of application to an article being labeled, and reduced incidence or likelihood of damage to an ink layer (as compared to pressure sensitive labels of the prior art, as described in the Background). To accomplish this, one aspect of the present invention provides a pressure sensitive label comprising: (a) a support portion including at least a carrier layer; and (b) a transfer portion including at least a printable layer in contacting relationship with the carrier layer. In general, the transfer portion may overlie the support portion for transfer of the transfer portion from the support portion to an article upon application of pressure to the transfer portion while the transfer portion is in contact with the article. In one aspect of the present invention, the carrier layer does not include any release layer between the carrier layer and the printable layer. This eliminates a layer of the labels of the prior art, thus reducing the cost of the label.

Further, in another aspect of the present invention, the printable layer may be applied in a softened, molten, thixotropic, liquid, etc. form that allows it to be applied as a pattern (such as in the shape, size, contour, etc. of a label image—i.e., graphics, text, indicia, etc.—that is to be produced) rather than being provided as a face stock that matches (or substantially matches) the area of the carrier layer (as in labels of the prior art). The printable layer is of a formulation that allows it to receive ink thereon following cooling, solidifying, UV-curing, etc. The ability to apply the printable layer in a pattern also reduces the amount of material that is needed for the web of labels (thereby reducing cost), eliminates the need for die cutting (and the waste of the discarded die cut material), and can be used to allow the entire label to be constructed in one location (as opposed to the need of acquiring a base pressure sensitive label stock from a third party supplier).

In other aspects, the label may include an ink layer positioned such that the printable layer is between the carrier layer and the ink layer. And, the label may include an adhesive layer positioned such that the ink layer is between the printable layer and the adhesive layer. By this configuration, the pressure sensitive labels described herein include the printable layer most proximal to the carrier, and the adhesive layer most distal to the carrier (which is a somewhat opposite configuration as compared to the pressure sensitive labels of the prior art). Due to this configuration, the transfer portion (e.g., printable layer, ink layer, adhesive layer) of the pressure sensitive labels described herein do not have to be peeled away from the carrier to expose the adhesive for adherence to an article. Rather, the labels are configured such that the adhesive is already the outer layer of the label construction prior to application to an article, and so the adhesive is pre-exposed and ready to contact an article—thereby increasing the ease of application to an article.

The configuration of the layers in this aspect and embodiment of the present labels also results in the ink being beneath the printable layer (and thus protected by the printable layer) once the transfer portion is transferred to an article. This results in the ink layer (the indicia, graphics, design, text, information, etc.) being protected from damage once the label is transferred to an article. This protection is achieved without have to add any additional protective lacquer layers (as is done sometimes with prior art pressure sensitive labels). The configuration that allows the printable layer to protect the ink layer following transfer also increases the number of materials that may be used in the ink layer—such as being able to use easily damaged materials, such as metallic inks.

In another aspect, the pressure sensitive label may further include a release layer positioned such that the carrier layer is between the printable layer and the release layer. In other words, the release layer is not on the side of the carrier adjacent to the transfer portion of the label, but rather is on the underside or backside of the carrier. This release layer allows the web of labels to be wound on a roll, for example, while preventing blocking (i.e., the problem of the adhesive on the labels adhering to the underside of the carrier as the web of labels is wound on the roll).

Another aspect of the present invention provides a pressure sensitive label comprising: (a) a support portion including at least a carrier layer; and (b) a transfer portion including at least a printable layer in confronting relationship with the carrier layer, and an ink layer may be present between the printable layer and the carrier layer. Depending on the nature of the ink layer, at least a portion or portions of the printable layer may contact the carrier layer (i.e., in any areas where ink or inks of the ink layer are not present). In general, the transfer portion may overlie the support portion for transfer of the transfer portion from the support portion to an article upon application of pressure to the transfer portion while the transfer portion is in contact with the article. In one embodiment, the carrier layer does not include any release layer on the side of the carrier layer facing the ink layer. This eliminates a layer of the labels of the prior art, thus reducing the cost of the label. In this configuration, the pressure sensitive labels of this aspect include the ink layer most proximal to the carrier, and the adhesive layer most distal to the carrier. Due to this configuration, the transfer portion (e.g., ink layer, printable layer, adhesive layer) of the pressure sensitive labels described in this aspect do not have to be peeled away from the carrier to expose the adhesive for adherence to an article. Rather, the labels are configured such that the adhesive is already the outer layer of the label construction prior to application to an article, and so the adhesive is pre-exposed and ready to contact an article—thereby increasing the ease of application to an article. Further, this version of the label may also include a release layer positioned such that the carrier layer is between the ink layer and the release layer (to prevent blocking when the web of labels is wound on a roll, for example).

Another aspect of the present invention may include a method or methods for making a pressure sensitive label. And another aspect of the present invention may include a method or methods for applying a pressure sensitive label to an article.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, various aspects of the present invention address the drawbacks described above with pressure sensitive labels of the prior art by providing pressure sensitive labels that, among other characteristics, have reduced layers, reduced cost, increased recyclability, increased ease of application to an article being labeled, and reduced incidence or likelihood of damage to an ink layer (as compared to pressure sensitive labels of the prior art, as described in the Background). To accomplish this, one aspect of the present invention provides a pressure sensitive label comprising: (a) a support portion including at least a carrier layer; and (b) a transfer portion including at least a printable layer in contacting relationship with the carrier layer. In general, the transfer portion may overlie the support portion for transfer of the transfer portion from the support portion to an article upon application of pressure to the transfer portion while the transfer portion is in contact with the article. In one aspect of the present invention, the carrier layer does not include any release layer between the carrier layer and the printable layer. This eliminates a layer of the labels of the prior art, thus reducing the cost of the label.

Figure 2:
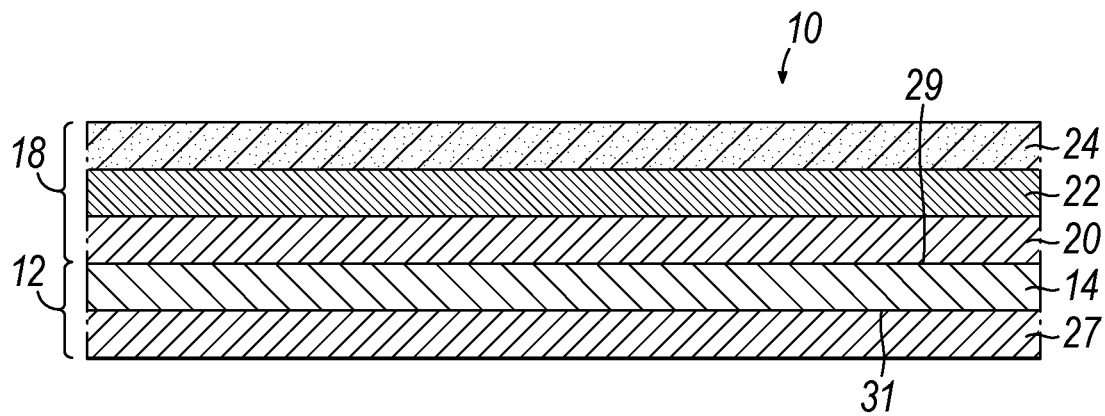
FIG. 2 is a cross-sectional view of one embodiment of a pressure sensitive label construction in accordance with principles of the present invention.

Referring now to FIG. 2, one embodiment of such a pressure sensitive label 10 is shown. As can be seen in FIG. 2, the pressure sensitive label 10 of the illustrated embodiment is a multilayered construction, with each layer having its own function. Other embodiments are also of a multilayered construction. In general, the labels include a "support portion" 12 (e.g., a carrier layer 14) and a "transfer portion" 18 (e.g., at least a printable layer 20—although various embodiments may also include an ink layer 22, and an adhesive layer 24, for example). When subjected to pressure, as will be described in greater detail below, the transfer portion 18 may be separated from the carrier 14 to adhere to an article. This occurs when the label 10 is placed in confronting relationship with an article 26 and pressure is applied, such that the transfer portion 18 makes direct contact with an outer surface 28 of the article 26 (an article 26 can be seen in FIGS. 7 and 8). After contact of the transfer portion 18 to the article 26, the carrier sheet 14 is removed, leaving the transfer portion 18 affixed to the article 26 via the adhesive layer 24 of the transfer portion 18.

There may be several embodiments of the pressure sensitive labels 10 in accordance with aspects of the present invention. All embodiments include the general support portion 12 and transfer portion 18 described above. The support portion 12 of each embodiment includes a carrier layer 14, which may have a release coating 16 (e.g., a wax or silicone coating) on one side thereof (which can be seen in the embodiment shown in FIG. 2A). In an alternate embodiment, the carrier 14 may have no release coating, but may be otherwise treated, such as by a corona treatment. In still other embodiments, the carrier 14 may be untreated and have no release coating. The transfer portion 18 of each of the embodiments is positioned adjacent to, and in confronting relationship with, the carrier 14 prior to transfer therefrom. The transfer portion 18 of the embodiments includes at least (1) a printable layer 20 in confronting relationship with the carrier 14. Such a confronting relationship does not require contact between the two layers (although contact is possible). The layers merely need be proximal and adjacent one another, though there may be one layer or coating between the carrier 14 and the printable layer 20—e.g., as in FIG. 2A. The transfer portion 18 may also include an ink layer 22, and an adhesive layer 24. In the embodiments shown in FIGS. 2 and 2A, the ink layer 22 may be positioned such that the printable layer 20 is between the carrier layer 14 and the ink layer 22. And, in those embodiments, the adhesive layer 24 may be positioned such that the ink layer 22 is between the printable layer 20 and the adhesive layer 24. Additional layers may be included within the transfer portion 18.

Certain layers of the pressure sensitive label 10 may be made with UV-curable materials (and in some embodiments, all the layers may include UV-curable materials). UV-curable materials are generally known to those of ordinary skill in the art. For example, certain inks, coatings and adhesives are formulated with photoinitiators and resins. When exposed to the correct energy and irradiance in a certain band of UV light, polymerization occurs, and so the material cures. This reaction may take only a few seconds. The UV sources used may include UV lamps and UV LEDs. Fast processes such as flexographic printing (which may be used for certain layers on certain embodiments of the pressure sensitive labels, or on all layers) may use high intensity light.

Referring still to FIG. 2, the illustrated embodiment includes a carrier layer 14, a printable layer 20, an ink layer 22, a pressure sensitive adhesive layer 24, and a backside release layer 27. As can be seen from FIG. 2, the release layer 27 is positioned such that the carrier layer 14 is between the printable layer 20 and the release layer 27. As will be described in further detail below (in a more detailed discussion of the various layers of the labels 10), the backside release layer 27 prevents blocking when the web of labels is wound on a roll, for example.

As described above, the various pressure sensitive label embodiments in accordance with principles of the present invention include a carrier layer 14. The carrier layer 14 as used in certain embodiments (and in the illustrated embodiment of FIG. 2) is of a material that allows the transfer portion 18 of the label 10 to separate from the carrier layer 14 without the need for a separate release layer (such as release layers in the prior art). This allows for the reduction in materials and cost used in the present pressure sensitive labels. And so, in embodiments of the present invention, the carrier layer 14 is of, or includes, a material having a surface tension that allows the printable layer 20 to releasably bond thereto. And, in more specific embodiments of the present invention, the surface of the carrier layer 14 that contacts the printable layer 20 may have a dyne level below about 32.

Figure 6:
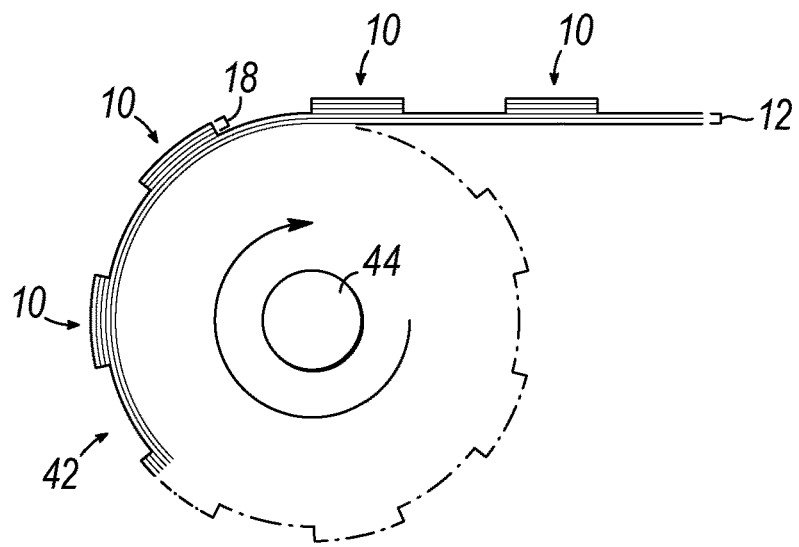
FIG. 6 is a schematic showing a completed pressure sensitive label in accordance with principles of the present invention on a roll of labels.

Further, as described above, a web of the labels 10 may be wound on a roll (See, for example, FIG. 6). In the wound state, the adhesive layer 24 of a label will contact the carrier portion 12 of the label web on top of it (and may particularly contact the backside release layer 27). In such embodiments, the bond of transfer portion 18 to the carrier 12 needs to be stronger than any bond between the adhesive layer 24 and the release layer 27 (or back surface of carrier 14) of an adjacent portion of the wound web. This prevents the transfer portion 18 from prematurely separating from the support portion 12 during unwinding of the roll.

The carrier layer 14 of various embodiments of the present invention may include various materials, so long as those materials allow for a releasable bond of the printable layer 20 thereto (as described above). For example, the carrier layer 14 may be chosen from materials such as plastic film, foil, parchment, lightweight paper, and heavyweight paper. In one specific exemplary embodiment, the carrier layer 14 may include polypropylene. And, more specifically, in certain embodiments, the carrier layer may be a biaxially-oriented co-extruded polypropylene film having an oriented polypropylene core, a treatable polyolefin layer on the underside of the core, and a corona treated polyolefin layer on the topside of the core (i.e., the treatable polyolefin layer being the side that would confront and/or contact the printable layer—the treatable layer including the surface that receives the printable layer when the printable layer contacts the treatable layer). In one specific embodiment, the carrier layer may include RAYOFACE® C 160 film, commercially available from Innovia Films, Inc. of Atlanta, Ga.

A second film is commercially available under the product name TT—General Purpose Non Heatsealable BOPPfilm, from AmTopp of Livingston, N.J. This film is also a coextruded film with an oriented polypropylene core, a treatable polypropylene layer on the underside of the laminate, and a high energy treated polypropylene layer on the top. Like the embodiment of film described above, the underside is the layer which will be printed.

Yet another film, in another embodiment of the present invention, is commercially available under the product name Hostaphan® 447CRL Clear Non-Silicone Release Liner, from Mitsubishi Polyester Film of Greer, S.C. This film is chemically primed on one surface for adhesive release and a low coefficient of friction, and is chemically primed on the opposite surface for adhesion promotion.

In other embodiments (such as the illustrated embodiment of FIG. 2A), the carrier layer may have a coating 16 applied to the surface that will confront the printable layer 20 of the label 10. Thus, the carrier layer 14 has two surfaces: (1) a top surface 29, which has a surface tension low enough to allow the printable layer 20 to releasably bond to it (which can be accomplished, as described above, with various treatments of the top surface—such as with silicones and/or waxes in the embodiment of FIG. 2A); and (2) a bottom surface 31, which is treated (as will be described in greater detail below) to prevent adhesives 24 from adhering to it—thereby allowing the finished web of labels to be wound into a roll (and subsequently unwound during the label application process) without damaging the labels by having the labels adhere to one another and to the web (i.e., blocking).

In the more specific embodiments of the carrier described above, the surface of the carrier layer 14 that contacts the printable layer 20 may have a dyne level below about 32.

Figure 1:
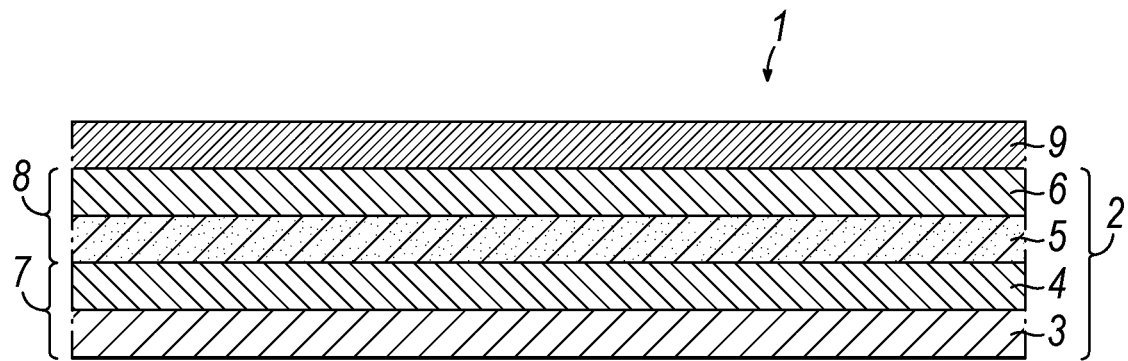
FIG. 1 is a cross-sectional view of a typical pressure sensitive label construction of the prior art.

As described above, the pressure sensitive label 10 of the various embodiments also includes a printable layer 20 that may be disposed onto and may contact the carrier layer 14. This is different from pressure sensitive labels of the prior art (as shown in FIG. 1), which included a pressure sensitive adhesive 5 against a release layer 4 on the carrier layer 3. Referring again to FIGS. 2 and 2A, the printable layer 20 may be a film layer positioned in confronting relationship with the carrier layer, or it may be a material, such as a varnish, which can be printed onto the carrier layer, to thereafter solidify (or be solidified) to a state that allows the printing of an ink design (text, graphics, and all other indicia) thereon. By using a printable layer 20 that may be applied in a softened, molten, thixotropic, liquid, etc. form, the printable layer 20 may be applied as a pattern (such as in the shape, size, contour, etc. of a label that is to be produced) rather than being provided as a face stock that matches (or substantially matches) the area of the carrier layer (as in labels of the prior art). The printable layer 20 is of a formulation that allows it to receive ink thereon following cooling, solidifying, UV-curing, etc. The ability to apply the printable layer 20 in a pattern also reduces the amount of material that is needed for the web of labels (thereby reducing cost), eliminates the need for die cutting (and the waste of the discarded die cut material), and can be used to allow the entire label to be constructed in one location (as opposed to the need of acquiring a base pressure sensitive label stock from a third party supplier).

In certain embodiments, the printable layer 20 may include a material formulated from a base resin. This base resin may, in various embodiments, be chosen from vinyls, acrylics, urethanes, epoxys, polyesters, and alkyds. Further, the printable layer 20 is solvent-based, water-based, or ultraviolet curable-based. The printable layer 20, including these solvent-based, water-based, and/or UV curable-based chemistries, (which are formulated from the base resins), may be formulated into a printable liquid at the viscosity and rheology applicable to various printing processes (such as screen printing, ink-jet printing, flexographic printing, rotogravure printing, and lithographic printing for example). In one specific embodiment, the printable layer may include an imprintable varnish including a triacrylate ester monomer, a diacrylate ester monomer, an aromatic urethane acrylate, a difunctional acrylate, an acrylate oligomer, triethanolamine, and 4-phenylbenzophenone. In a more specific embodiment, the printable layer may include an imprintable varnish including about 30 wt % to about 50 wt % of a triacrylate ester monomer, about 10 wt % to about 12.5 wt % to of a diacrylate ester monomer, about 10 wt % to about 12.5 wt % of an aromatic urethane acrylate, about 10 wt % to about 12.5 wt % to of a difunctional acrylate, about 5 wt % to about 7 wt % of an acrylate oligomer, about 3 wt % to about 5 wt % of triethanolamine, and about 1 wt % to about 2 wt % of 4-phenylbenzophenone Such an imprintable varnish may be supplied in liquid form, have a density of about 1.07 g/cm$^3$ (about 8.92 lb/gal or about 1070 g/l), have a flash point of greater than about 93° C., and a boiling point of about 106° C. One example of such an imprintable varnish is commercially available from INX International Ink Co. of Schaumburg, Ill., under the product name PROCURE™ KCC5185 varnish (and product code 1487893). Another such print-receptive coating is JRX-1253 coating, commercially available from Dyna-Tech Adhesives and Coatings, Inc., of Grafton, W. Va. JRX-1253 is a UV radiation cured printable and metallizable coating for plastics such as PET, PE, etc. It is printable with UV and classical solvent and water based inks. At 100% solids, it is clear after curing. Those of ordinary skill in the art will recognize that other materials of the same or similar characteristics may be used in embodiments of the present invention.

In other aspects, the label 10 may include an ink layer 22 positioned such that the printable layer 20 is between the carrier layer 14 and the ink layer 22. And, the label 10 may include an adhesive layer 24 positioned such that the ink layer 22 is between the printable layer 20 and the adhesive layer 24. By this configuration, the pressure sensitive labels 10 described herein include the printable layer 20 most proximal to the carrier 14, and the adhesive layer 24 most distal to the carrier 14 (which is a somewhat opposite configuration as compared to the pressure sensitive labels of the prior art). Due to this configuration, the transfer portion 18 (e.g., printable layer 20, ink layer 22, adhesive layer 24) of the pressure sensitive labels described herein do not have to be peeled away from the carrier to expose the adhesive for adherence to an article. Rather, the labels 10 are configured such that the adhesive 24 is already the outer layer of the label construction prior to application to an article 26, and so the adhesive 24 is pre-exposed and ready to contact an article 26—thereby increasing the ease of application to an article 26.

The configuration of the layers in these embodiments of the present labels (e.g., those shown in FIGS. 2 and 2A) also results in the ink being beneath the printable layer 20 (and thus protected by the printable layer 20) once the transfer portion 18 is transferred to an article 26. This results in the ink layer 22 (the indicia, graphics, design, text, information, etc.) being protected from damage once the label 10 is transferred to an article 26. This protection is achieved without having to add any additional protective lacquer layers (as is done sometimes with prior art pressure sensitive labels). The configuration that allows the printable layer 20 to protect the ink layer 22 following transfer also increases the number of materials that may be used in the ink layer 22—such as being able to use easily damaged materials, such as metallic inks.

The inks used in the ink layer 22 are used to create the various indicia (e.g., text, graphics, etc.) of the label. The indicia may be printed using any printing process including, but not limited to, offset printing, flexographic printing, rotogravure printing, letterpress printing, digital printing, ink jet printing, and screen printing. Further, the incorporation of standard printing effects such as combination printing (the use of gravure printing in combination with flexographic printing in a single press), the use of cold-foil and hot-foil decoration, and pattern embossing, for example, are contemplated by the invention described herein.

In one embodiment, the ink layer 22 may include UV-curable inks. In one particular embodiment, the UV-curable ink may include a blend of at least polyfunctional components and photoinitiators. In particular, the polyfunctional components may be polyfunctional acrylates. In one embodiment, the UV-curable ink may include polyfunctional acrylates in an amount of greater than 30% based on the total resin weight. More specifically, one embodiment of a UV-curable ink may include polyfunctional acrylates in an amount of 65-95 wt %, and a photoinitiator blend in an amount of 1-20 wt %. An example of such an ink is FP-500 UV process red ink, commercially available from Gotham Ink Corporation of Marlboro, Mass. Another such ink is commercially available from INX International Ink Co., of Schaumberg, Ill., which uses only polyfunctional components in its ink formulations (and thus does not include any monofunctional components) and is offered under the trade name INXFlex2000 UV HTL inks. Another ink that can be used is an "ITX-Free" ink commercially available from INX International Ink Co., of Schaumberg, Ill.

Yet another embodiment of an ink that may be used is one including polyester acrylate, glycerol propoxy triacrylate [e.g., poly(oxy(methyl-1,2,-ethanediyl)), alpha, alpha', alpha''-1,2,3-propanetriyltris(omega-((1-oxo-2-propenyl) oxy)-; such as that under CAS number 52408-84-1], hydroxycyclohexyl phenyl ketone (CAS number 947-19-3) and acrylic acid monoester with propane-1,2-diol (CAS number 25584-83-2). In one specific embodiment of this ink, the polyester acrylate may be present in an amount of about 1 wt % to about 5 wt %, the glycerol propoxy triacrylate may be present in an amount of about 1 wt % to about 5 wt %, the hydroxycyclohexyl phenyl ketone may be present in an amount of about 0.5 wt % to about 1.5 wt %, and the acrylic acid, monoester with propane-1,2-diol may be present in an amount of about 0.1 wt % to about 1 wt %. The ink may have a flashpoint higher than about 93.3° C., a boiling/condensation point of about 100° C., a density of about 1049 g/l (about 8.7539 lbs/gal), and a viscosity [kinematic (room temperature)] of greater than about 2.2 cm$^2$/s (greater than about 220 cSt). The VOC content of such an ink may be about 0.5% by weight. One such ink is a UV LED curing flexo ink commercially available from Flint Group Narrow Web of Plymouth, Minn., under the trade name Ekocure FTM.

In another embodiment, the ink may be a solvent based ink, and may include ethanol, propylene glycol methyl ether, propyl acetate, isopropanol, and aluminum flake. In one specific embodiment, the solvent based ink may include about 25 wt % to about 35 wt % ethanol, about 20 wt % to about 25 wt % propylene glycol methyl ether, about 15 wt % to about 20 wt % propyl acetate, about 15 wt % to about 20 wt % isopropanol, and about 3 wt % to about 5 wt % aluminum flake. Such an ink may have a density of about 0.888 g/cm$^3$, a flashpoint estimated to be greater than about 23° C., and a boiling point of about 78.5° C. to about 119.9° C. One such ink is commercially available from INX International Ink Co., of Schaumberg, Ill., under the name "Platinum Plus F124 Metallic" ink and product code 1489010.

Other inks that may be used include digital inks, such as those commercially available from Indigo Ink of Columbia, Md. However, one of ordinary skill in the art will recognize that the above-described inks are not the only inks that can be used.

The various embodiments of the pressure sensitive label 10 (such as those illustrated in FIGS. 2 and 2A) also include a pressure sensitive adhesive 24. In various embodiments of the present invention, the adhesive chemistry used for the pressure sensitive adhesive 24 can include any formulation capable of being applied in a pattern duplicating or similar to the contour, size, and shape of the printable layer 20 as applied to the carrier 14.

As is generally known, pressure sensitive adhesives are adhesives which form a bond when pressure is applied to marry the adhesive with the adherend. No solvent, water, or heat is needed to activate the adhesive in such instances. As the name indicates, the degree of bond is influenced by the amount of pressure which is used to apply the adhesive to the surface. Further, pressure-sensitive adhesives are manufactured with either a liquid carrier or in 100% solid form. Articles such as labels are made from liquid pressure sensitive adhesives by coating the adhesive on a support and evaporating the organic solvent or water carrier, usually in a hot air dryer. The dry adhesive may be further heated to initiate a cross-linking reaction and increase molecular weight. 100% solid pressure sensitive adhesives may be low viscosity polymers that are coated and then reacted with radiation to increase molecular weight and form the adhesive (a radiation cured pressure sensitive adhesive); or they may be high-viscosity materials that are heated to reduce viscosity enough to allow coating, and then cooled to their final form (a hot melt pressure sensitive adhesive).

The pressure sensitive adhesive used may be consistent with typical gravure printing, but modified to allow printing with flexographic techniques. A formulation for such a solvent adhesive may be UV curable. One particular adhesive in one specific embodiment of the present invention may be a high tack pressure sensitive adhesive adaptable for flexographic printing and having a viscosity of 1500-2000 cPs. Such an adhesive may include about 37.5 wt % to about 80 wt % acrylate, and about 2.5 wt % to about 10 wt % of a photoinitiator (along with additional materials making the remainder of the formulation). The adhesive provided under this formulation may have a flash point of about 94° C., and a specific gravity at 20° C. of about 1.06 g/cm³ (about 8.85 lbs/gal). One such adhesive is commercially available from Craig Adhesives & Coatings of Newark, N.J. under the product name CRAIGBOND® 1029BTJ UV High Tack PSA adhesive.

Another such adhesive in one specific embodiment of the present invention may have a formula including at least nonylphenol ethoxylated acrylate (CAS number 50974-47-5), and ethoxyethoxy ethyl acrylate (CAS number 7328-17-8), among other materials. The adhesive may also include 2-hydroxy-2-methyl-1-phenyl-1-propanone. One such adhesive is commercially available from Craig Adhesives & Coatings of Newark, N.J. under the product name Craigcote 1029J adhesive.

Another adhesive that may be used in various embodiments of the present invention includes a self-crosslinking acrylic polymer that cures upon solvent removal. Such an adhesive may be about 53% to about 56% non-volatiles with a Brookfield viscosity at 77° F. of about 3500 to about 6000. The solvent of the adhesive may be ethyl acetate/heptanes with a solvent ratio of 83/17. The adhesive may have a density of about 7.7 to about 8.1 lbs/gal (about 0.92 to about 0.98 gm/cm3), and a flash point of less than about 20° F. An example of such an adhesive is commercially available from Ashland Performance Materials of Dublin, Ohio under the tradename AROSET™ PS-6416 adhesive.

Yet another adhesive that may be used in various embodiments of the present invention includes a hot melt pressure sensitive adhesive. Such an adhesive is 100% solids with a viscosity of about 66,500 at 300° F., a Mettler softening point of about 250° F., and a density of about 7.8 lbs/gal. Such an adhesive may also include a piperylene copolymer and a modified terpene resin. In one specific embodiment, this adhesives may include about 10% to about 30% piperylene copolymer and about 10% to about 30% modified terpene resin. The adhesive may have a boiling point of greater than about 260° C., a melting point of about 110° C., a specific gravity of about 0.98, and a flash point of greater than about 260° C. (by the Cleveland open cup method). An example of such an adhesive is commercially available from Henkel Corporation of Rocky Hill, Conn. under the trade name Technomelt® and product number Technomelt® PS 9197 adhesive.

However, one of ordinary skill in the art will recognize that these are not the only adhesives that can be used. For example, other UV-curable adhesives may be used. Ultraviolet (UV) light curing adhesives, also known as light curing materials (LCM), have become popular within the manufacturing sector due to their rapid curing time and strong bond strength. Light curing adhesives can cure in as little as a second and many formulations can bond dissimilar substrates (materials) and withstand harsh temperatures. Unlike traditional adhesives, UV light curing adhesives not only bond materials together but they can also be used to seal and coat products.

In this embodiment of the pressure sensitive labels 10, the adhesive layer 24 is UV cured following the printing step. As such, the label 10 can be wound in roll form without blocking (due to tackiness). During the decoration step, heat (or heat and pressure) is applied and the adhesive becomes soft, fluid, and tacky just prior to application at which point the label 10 bonds to the substrate.

One such UV-curable heat activated adhesive is HS30 adhesive and is commercially available from Actega Radcure Inc. of Wayne, N.J. Per the MSDS, HS30 is used as a UV/EB curable adhesive, primer, coating. Another such heat activated UV cured adhesive is FP-500 NUV85 from Gotham Ink Corporation of Marlboro, Mass. FP-500 NUV85 adhesive is a proprietary mixture of materials. However, those of ordinary skill in the art will recognize that these are not the only UV-curable adhesives that can be used, and that other UV-curable adhesives providing similar characteristics can be used.

Figure 2A:
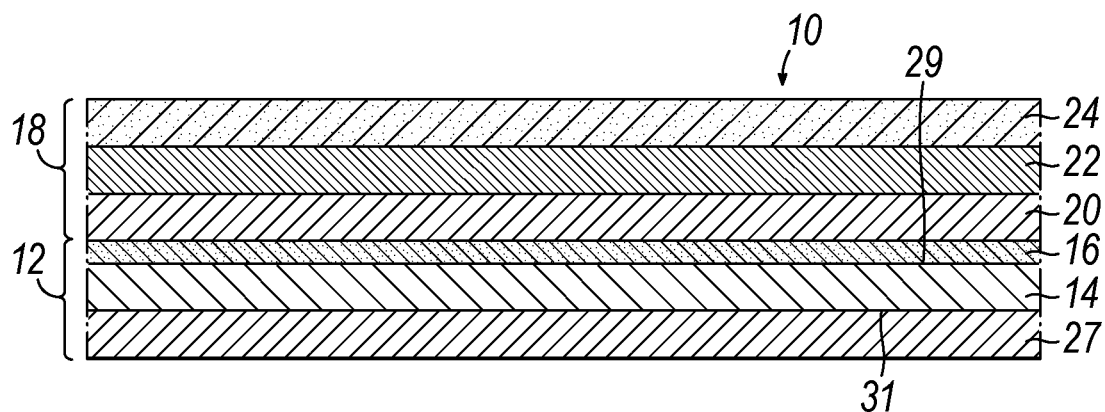
FIG. 2A is a cross-sectional view of another embodiment of a pressure sensitive label construction in accordance with principles of the present invention.

In another aspect, the pressure sensitive label 10 as shown in the embodiments of FIGS. 2 and 2A may further include a release layer 27 positioned such that the carrier layer 14 is between the printable layer 20 and the release layer 27. In other words, the release layer 27 is not on the side of the carrier 14 adjacent to the transfer portion 18 of the label 10, but rather is on the underside of the carrier 14. This release layer 27 allows the web of labels 10 to be wound on a roll, for example, while preventing blocking (i.e., the problem of the adhesive on the labels adhering to the underside of the carrier as the web of labels is wound on the roll). Thus, the presence and positioning of this release layer 27 allows the web of labels to be wound into a roll after printing of the labels 10. In particular, the bond of the pattern applied printable layer 20 is greater to the top surface of the continuous web of the carrier layer 14 than it is to the release layer 27 on the bottom side of the carrier layer 14. Thus, when the roll is unwound, the label 10 is positioned adhesive side up to allow ease of application to articles 26 being labeled.

One particular release formulation for a release layer in one specific embodiment of the present invention may include a UV curable release material, and such a material may—in one embodiment—be a cationic release coating. Such a release formulation may include dimethyl siloxanes and silicones (CAS number 67762-95-2). An example of such a material is commercially available from Craig Adhesives and Coatings, of Newark, N.J., under the trade name Craigcoat UV9300 and product code uv9300. In an embodiment of the present invention, the release material described above may include a photocatalyst material used in conjunction therewith. Such a photocatalyst material may include—in one embodiment—2-isopropylthioxathone, C12 and C14 alkylglycidyl ethers, bis(4-dodecylphenyl) iodonium hexafluoroantimonate, and linear alkylate dodecylbenzene. More specifically, a certain embodiment may include about 1% to about 5% 2-isopropylthioxathone, about 30% to about 60% C12 and C14 alkylglycidyl ethers, about 30% to about 60% bis(4-dodecylphenyl)iodonium hexafluoroantimonate, and about 5% to about 10% linear alkylate dodecylbenzene. An example of such a photocatalyst material is commercially available from Craig Adhesives and Coatings, of Newark, N.J., under the trade name UV9390C.

As described above, and referring now to FIGS. 3 and 3A, another aspect of the present invention provides a pressure sensitive label comprising: (a) a support portion including at least a carrier layer; and (b) a transfer portion including at least a printable layer in confronting relationship with the carrier layer. In a label of this aspect, an ink layer may be present between the printable layer and the carrier layer. Depending on the nature of the ink layer, at least a portion or portions of the printable layer may contact the carrier layer (i.e., in any areas where ink or inks of the ink layer are not present). In general, the transfer portion may overlie the support portion for transfer of the transfer portion from the support portion to an article upon application of pressure to the transfer portion while the transfer portion is in contact with the article. In one embodiment, the carrier layer does not include any release layer on the side of the carrier layer facing the printable layer. This eliminates a layer of the labels of the prior art, thus reducing the cost of the label. In this configuration, the pressure sensitive labels of this aspect include the ink layer most proximal to the carrier, and the adhesive layer most distal to the carrier. Due to this configuration, the transfer portion (e.g., ink layer, printable layer, adhesive layer) of the pressure sensitive labels described in this aspect do not have to be peeled away from the carrier to expose the adhesive for adherence to an article. Rather, the labels are configured such that the adhesive is already the outer layer of the label construction prior to application to an article, and so the adhesive is pre-exposed and ready to contact an article—thereby increasing the ease of application to an article.

Figure 3:
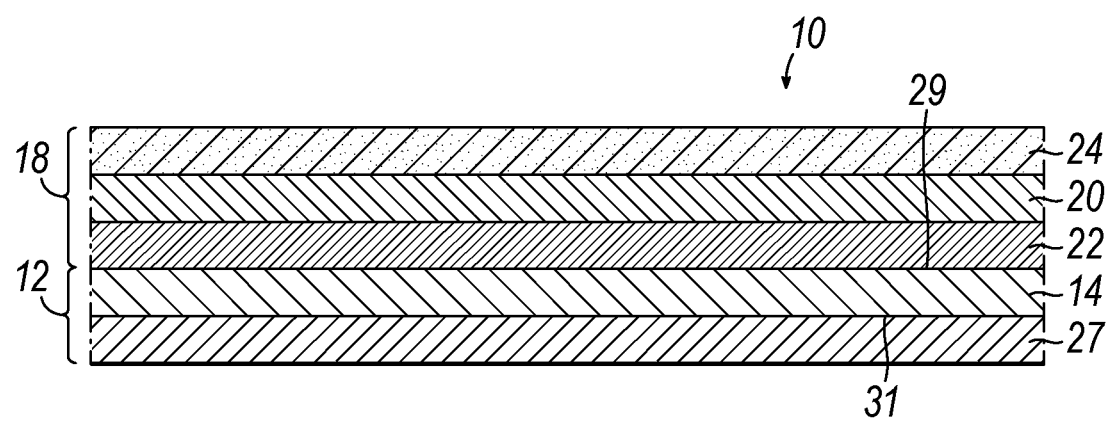
FIG. 3 is a cross-sectional view of another embodiment of a pressure sensitive label construction in accordance with principles of the present invention.

Referring now to FIG. 3, a particular embodiment of such a pressure sensitive label 10 is shown. As can be seen in FIG. 3, the pressure sensitive label 10 of the illustrated embodiment is a multilayered construction, with each layer having its own function. Other embodiments are also of a multilayered construction. The embodiment of label shown in FIG. 3 does include the general support portion 12 and transfer portion 18 described above. The support portion 12 of each embodiment includes a carrier layer 14, which may have a release coating 16 (e.g., a wax or silicone coating) on one side thereof (which can be seen in the embodiment shown in FIG. 3A). In an alternate embodiment, the carrier 14 may have no release coating (on the carrier facing the ink layer—see the embodiment of FIG. 3), but may be otherwise treated, such as by a corona treatment. In still other embodiments, the carrier 14 may be untreated and have no release coating. The transfer portion 18 of each of the embodiments is positioned adjacent to, and in confronting relationship with, the carrier 14 prior to transfer therefrom. The transfer portion 18 of the embodiments includes at least (1) a printable layer 20 in confronting relationship with the carrier 14. Such a confronting relationship does not require contact between the two layers (although contact is possible). The layers merely need be proximal and adjacent one another. The transfer portion 18 may also include an ink layer 22, and an adhesive layer 24. The ink layer 22 may be positioned such that it is between the carrier layer 14 and the printable layer 20. And, the adhesive layer 24 may be positioned such that the printable layer 22 is between the ink layer 22 and the adhesive layer 24. Additional layers may be included within the transfer portion 18.

Referring still to FIG. 3, the illustrated embodiment includes a carrier layer 14, an ink layer 22, a printable layer 20, a pressure sensitive adhesive layer 24, and a backside release layer 27. As can be seen from FIG. 3, the release layer 27 is positioned such that the carrier layer 14 is between the ink layer 22 and the release layer 27. As will be described in further detail below (in a more detailed discussion of the various layers of the labels 10), the backside release layer 27 prevents blocking when the web of labels is wound on a roll, for example.

As described above, the various pressure sensitive label embodiments in accordance with principles of the present invention include a carrier layer 14. The carrier layer 14 as used in certain embodiments (and in the illustrated embodiment of FIG. 3) is of a material that allows the transfer portion 18 of the label 10 to separate from the carrier layer 14 without the need for a separate release layer (such as release layers in the prior art). This allows for the reduction in materials and cost used in the present pressure sensitive labels. And so, in embodiments of the present invention, the carrier layer 14 is of, or includes, a material having a surface tension that allows the printable layer 20 to releasably bond thereto. And, in more specific embodiments of the present invention, the surface of the carrier layer 14 that contacts the printable layer 20 may have a dyne level below about 32.

In other embodiments (such as the illustrated embodiment of FIG. 3A), the carrier layer may have a coating 16 applied to the surface that will confront the ink layer 22 of the label 10. Thus, the carrier layer 14 has two surfaces: (1) a top surface 29, which has a surface tension low enough to allow the ink layer 22 to releasably bond to it (which can be accomplished, as described above, with various treatments of the top surface—such as with silicones and/or waxes in the embodiment of FIG. 3A); and (2) a bottom surface 31, which is treated (as will be described in greater detail below) to prevent adhesives 24 from adhering to it—thereby allowing the finished web of labels to be wound into a roll (and subsequently unwound during the label application process) without damaging the labels by having the labels adhere to one another and to the web (i.e., blocking).

The printable layer 20 (in the embodiments of FIGS. 3 and 3A) will be positioned behind the ink or inks of the ink layer 22 once the label is applied to an article. The printable layer 20 is the filmic layer that provides some mass and bulk to the label. Further, the printable label may include pigments in its formulation in or to provide a degree of opaqueness (i.e., a background) to any label information, text, graphics, etc provided by the ink layer. This opaqueness may be provided in any color desired. Alternatively, the printable layer may be clear. The use of pigments to provide a degree of background coloration is well known to those of ordinary skill in the art.

Figure 3A:
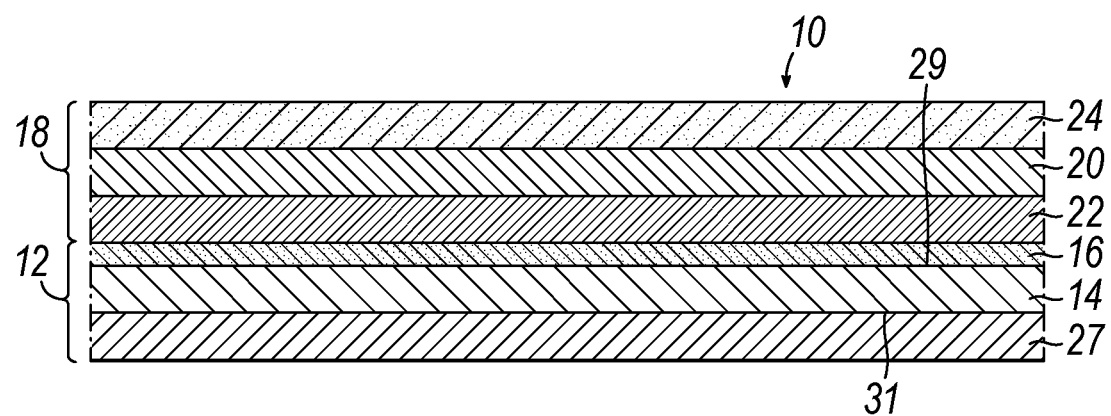
FIG. 3A is a cross-sectional view of yet another embodiment of a pressure sensitive label construction in accordance with principles of the present invention.

The layers (carrier 14, ink layer 22, printable layer 20, adhesive layer 24, backside release layer 27, etc.) of the embodiments of FIGS. 3 and 3A of the present invention may include various materials, including those described above with respect to the embodiments of FIGS. 2 and 2A.

Figure 4:
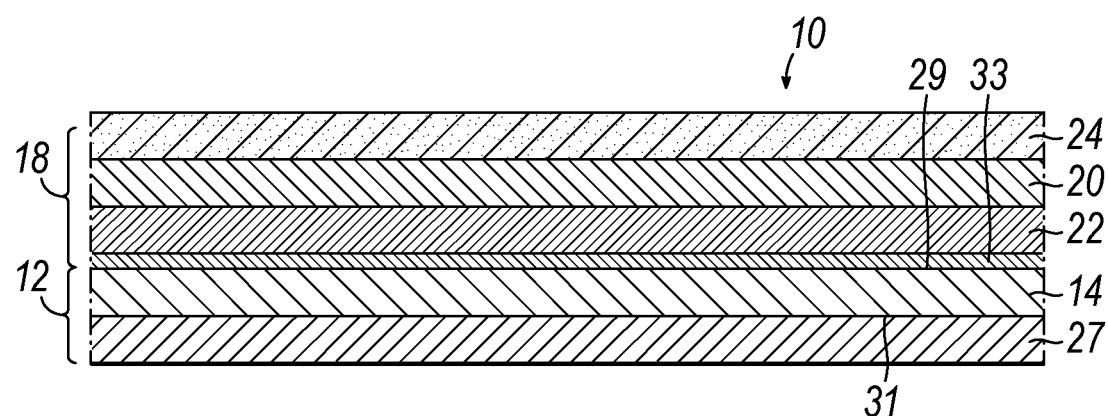
FIG. 4 is a cross-sectional view of another embodiment of a pressure sensitive label construction in accordance with principles of the present invention.
Figure 4A:
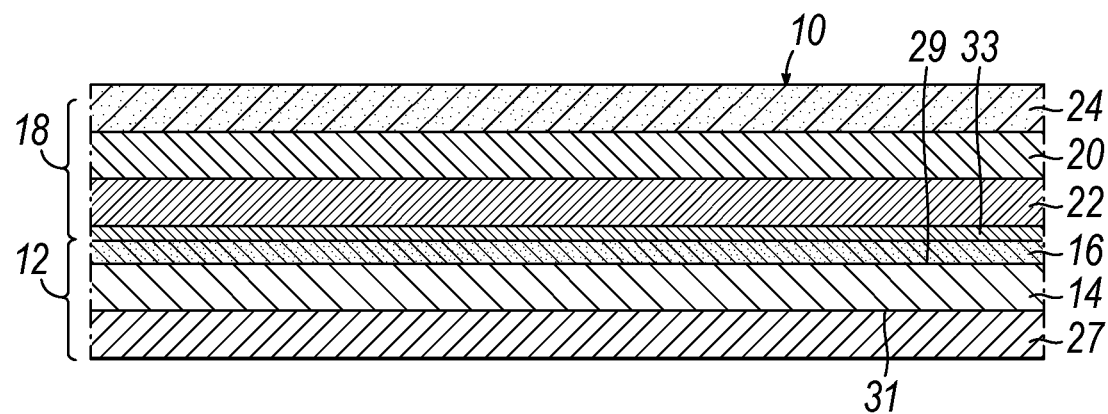
FIG. 4A is a cross-sectional view of yet another embodiment of a pressure sensitive label construction in accordance with principles of the present invention.

As described above, various embodiments of the label may include other layers. One such layer may be a protective layer, which may be used to protect the ink layer from abrasion following transfer of a label to an article (such as the version shown in FIGS. 3 and 3A, where the ink layer would be the outer exposed layer of the label following transfer. Such an embodiment including a protective layer 33 is shown in FIGS. 4 and 4A. The transfer portion 18 of this embodiment includes at least (1) a printable layer 20 in confronting relationship with the carrier 14. Such a confronting relationship does not require contact between the two layers (although contact is possible). The layers merely need be proximal and adjacent one another. The transfer portion 18 may also include an ink layer 22, and an adhesive layer 24. The ink layer 22 may be positioned such that it is between the protective layer 33 and the printable layer 20. And, the adhesive layer 24 may be positioned such that the printable layer 22 is between the ink layer 22 and the adhesive layer 24. And, the protective layer 33 may be positioned such that it is between the carrier 14 and the ink layer 22. (The embodiment shown in FIG. 4A is of similar construction, though it includes a separate release layer 16 on one side of the carrier 14.)

Referring still to FIG. 4, the illustrated embodiment includes a carrier layer 14, a protective layer 33, an ink layer 22, a printable layer 20, a pressure sensitive adhesive layer 24, and a backside release layer 27. As can be seen from FIG. 3, the release layer 27 is positioned such that the carrier layer 14 is between the protective layer 33 and the release layer 27. The backside release layer 27 prevents blocking when the web of labels is wound on a roll, for example (as has been described above with respect to the embodiments of FIGS. 2 and 3).

The protective layer 33 may be of various kinds including, but not limited to UV-cured or UV-curable overprint varnishes. However, the protective layer may be of other types (for example solvent gravure HTL protective layers).

In one example, then, the protective layer 33 may be a coating of a UV-curable chemistry in which the formula has been modified with additives that will increase the scuff resistance and or chemical resistance. Such a coating may have the properties of high gloss, chemical resistance, good UV reactivity, free of benzophenone and bisphenol A, and non-yellowing. One particular coating for a protective layer may have a film weight of 0.40-0.70 lbs/1000 sqft, using a 180-250 lpi, 6-9 billion cubic microns (bcm) per square inch anilox roll; a viscosity of 160 centipoise (cps) using a Brookfield RV, #3 spindle, 100 revolutions per minute (rpm) @ 77° F. (25° C.); may cure at 150-250 feet per minute (fpm) per 400 watts per inch (wpi) lamp; may appear as a translucent liquid; may have a gloss of >90 @ 60° angle (over black portion of Leneta N2A-3); may have a measured static CoF<0.30 and a kinetic CoF between 0.15-0.21, using a 200 gram sled; and may have a solvent resistance of >50 methylethyl ketone (MEK) double rubs (those of ordinary skill in the art will recognize that properties such as gloss CoF, and solvent resistance will depend on coating film thickness, degree of cure and substrate type). One specific example of such a coating to be used for a protective layer would be SunCure® HG (High Gloss) TL 4098 coating (commercially available under product number RCYFV0484098 from Sun Chemical, of Parsippany, N.J.). Such a coating may be applied with flexo, tower coater, or roller coater.

While the above embodiments (of FIGS. 4 and 4A) describe a protective layer 33 that is separate from the ink layer, alternate embodiments may include a protective layer that is combined with providing the graphics of the ink layer. This may be achieved by pigmenting the protective layer to be the color or colors of ink that is desired (and configured into the various desired graphics, text, etc. of the label.

Figure 5:
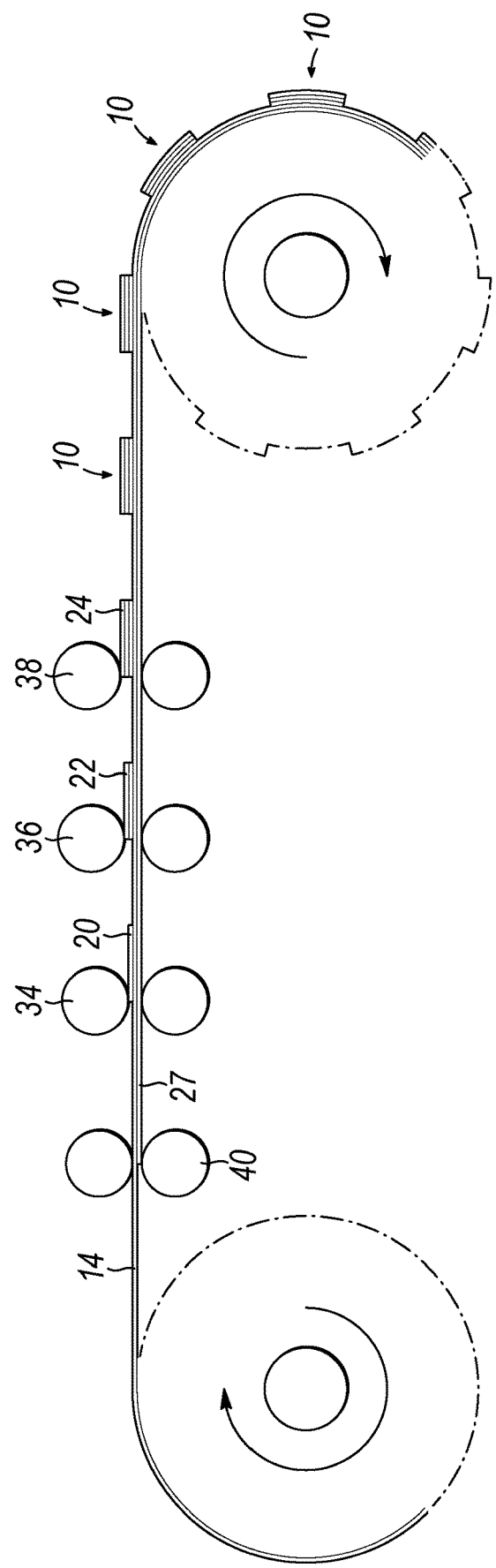
FIG. 5 is a schematic showing the preparation of a pressure sensitive label construction in accordance with principles of the present invention.

As described above, another aspect of the present invention may include a method or methods for making a pressure sensitive label. And still another aspect of the present invention may include a method or methods for applying a pressure sensitive label to an article. Referring now to FIG. 5, the pressure sensitive label 10 of embodiments such as that shown in FIG. 2 may be prepared as follows: The printable layer 20 may be laid down on a carrier layer 14 by a first roller/cylinder 34 (for example), followed by the ink layer 22 being laid down on the printable layer 20 by a second roller/cylinder 36, and then the adhesive layer 24 being laid down on the ink layer 22 by a third roller/cylinder 38, thereby forming a label 10 with these separate and distinct layers. During the process of laying down the printable layer 20, ink layer 22, and adhesive layer 24, a release layer 27 may also be applied to the opposite side of the carrier layer from the transfer portion of the label by a fourth roller/cylinder 40. In the embodiments where one or more of these layers (printable, ink, adhesive, release) is UV-curable, they may be exposed to UV radiation provided by ultraviolet light, which cures the various UV-curable layers. This UV-curing may be done as each separate UV-curable layer is laid down, or it may occur after all UV-curable layers have been laid down. (Further, although FIG. 5 shows, and is described as, putting down a printable layer followed by an ink layer, those skilled in the art will recognize that for embodiments of the label having a different ordering of layers—such as that shown in FIGS. 3 and 3A—the layers may be put down in a different order than shown in FIG. 5, e.g., ink layer put down followed by printable layer.)

Further, any UV-curable components may be applied using flexographic printing techniques. UV components do not present the problem of "swelling" when used in flexographic printing (unlike certain typical rotogravure solvent components). Flexographic printing is a process that is well known to those of ordinary skill in the art. In general, in the flexographic process (used for the UV cured ink), a flexible relief plate (not shown) includes image areas raised above the non-image areas. A component, such as ink, is transferred from an ink roll (not shown), which is partially submerged in an ink tank to a second roll (not shown) whose texture holds a specific amount of ink. A doctor blade (not shown) then removes excess ink from the second roll before inking the flexible relief plate. The substrate is then positioned between the plate and an impression cylinder (not shown) to transfer the image. While the plate is described as having "image areas," the "image" of those areas may be designed as to provide a floodcoating of the protective lacquer layer onto the substrate.

By using flexographic printing techniques for various layers of the label 10, this aspect of the present invention results in cost savings over that of previously manufactured pressure sensitive labels 10, (or labels 10 including a UV-curable layer), using rotogravure printing techniques. This is because rotogravure printing techniques are expensive, especially as compared to printing techniques such as flexographic printing. By eliminating gravure printing for the layers of the pressure sensitive label 10 (especially those that include the most complicated design—i.e., the ink layer 22), great cost savings may be realized due to the need not to have to provide multiple and different etched gravure cylinders for different production runs.

However, the layers of the labels 10 are not limited to flexographic techniques, and may be applied using other techniques, including gravure printing techniques. In rotogravure techniques (which are also well known to those of ordinary skill in the art), the printing plate (not shown) is in cylinder form, and includes wells that are etched or engraved to differing depths and/or sizes to provide the image or images. The component such as the protective lacquer or adhesive is applied directly to the cylinder by rotating in a bath (not shown) where each cell of the image is flooded with the lacquer or adhesive. A doctor blade (not shown) wipes away the excess lacquer or adhesive, and capillary action of the substrate and pressure from impression rollers (not shown) draw the lacquer or adhesive out of the wells and transfer it to the substrate.

Thus, the apparatus (not shown) for a gravure printed layer includes a gravure printing unit (not shown) for a rotary press, with a gravure sleeve (not shown) supplied with lacquer or adhesive from a gravure tray (not shown) and an impression roller (not shown), which lies in confronting relationship to the gravure sleeve, to form a roller gap (not shown) therebetween. When the rotary press is running, a carrier, such as a sheet material, that is to be printed is passed through the roller gap, taking up lacquer or adhesive from the peripheral surface of the gravure sleeve. At the same time, the gravure sleeve rotates in a specified direction opposite to that of the impression roller and its rotational movement is composed of a leading, rotating sector from the printing unit to the roller gap and a trailing rotating sector from the roller gap to the printing unit. Apparatus and techniques for both rotogravure and flexographic printing are common and are very well known to those of ordinary skill in the art.

Further, as has been mentioned above, certain layers of the label (e.g., printable layer 20, ink layer 22, and adhesive layer 24), may be laid down, or printed, in a particular pattern corresponding to the size, shape, and/or contour of the desired end label image. This also results in solving a problem of the prior art (which led to too much material being used, and thus, increased cost to labels). Because the ink design is printed only on a portion of the base construction that (in prior art) is purchased from a third party, this requires that the face stock onto which the ink is printed be a film that spans the entirety of the carrier (to be die cut later on). It also requires that the adhesive (which is part of the base construction in the prior art) be flood coated onto the carrier (since this is done before sale of the base construction). In other words, since the carrier suppliers do not know in advance what ink designs will be applied by the label-maker, they flood-coat the entire carrier with adhesive, and cover the entirety of the carrier with face stock, to allow for any size, shape, configuration, and registration of ink design. The use of such a large amount of face stock and flood-coated adhesive results in a large amount of unused, and thus excess, adhesive, as well as an excess amount of face stock that must be die cut and discarded. The use of this excessive amount of adhesive and face stock results in increased costs to the prior art labels, because the excess amount of face stock and adhesive results in increased cost of the carrier, and thus increased cost of label preparation and of the labels themselves.

However, the design of the present pressure sensitive label 10 allows for printing of a printable layer 20 to be laid down in a pattern, as well as a patterned ink layer 22 and an adhesive 24. This is due in part to the construction of the label in somewhat reverse order to previous pressure sensitive labels. In other words, the prior art labels had an adhesive disposed on the release of a carrier, with the face stock on top of the adhesive, and the ink on top of the face stock. In the label of the present application, the printable layer may be applied at the site of labeling with the ink on top of the printable layer and the adhesive on top of that. Since this occurs at the site of labeling, the entity providing and creating the label will know at the time of printing what the design of the label will be. And so, rather than providing a face stock of the same area as the carrier, the present invention does not use a face stock. Rather, the typical face stock of pressure sensitive labels of the prior art is eliminated, and instead a printable layer (such as an imprintable varnish) may be placed down on the carrier. This allows one to print the printable layer in the shape of the final label design—which allows one to create a label without the need for die cutting any extra face stock. In one embodiment, the printable layer may be applied using a 30 bcm anilox roller.

In the same manner, this allows one to also print the adhesive onto the ink design in the shape of the ink design (i.e., having a same or similar outer contour to the ink design) in order to avoid the waste of excess adhesive that occurs via floodcoating in the prior art. In one embodiment, the ink layer may be applied using an 8 bcm anilox roller. In one embodiment, the adhesive layer may be applied using a 4.5 bcm anilox roller. In another embodiment, the adhesive layer may be applied using an 8 bcm anilox roller.

For example, then, another aspect of the present invention provides a process for applying a printable layer 20, ink layer 22, and/or an adhesive layer 24 onto a carrier, wherein the printable layer 20, ink layer 22, and/or adhesive layer 24 covers less than substantially the entire surface of a first side of the carrier. Thus, the printable layer 20, ink layer 22, and/or adhesive layer 24 can be applied in a patterned form and/or can be applied to match any size, shape, configuration, or registration desired for a label. More specifically, this process may include contacting the materials for the printable layer 20, ink layer 22, and/or adhesive layer 24 with a surface having at least one etched region thereon, and confronting the carrier 14 (for example) with the surface such that at least a portion of the printable layer 20 transfers from the surface to the carrier 14. The printable layer that transfers may particularly be received by and transferred from the etched region of the surface. Thus, the process may include (a) softening a material for the printable layer 20 (such as by melting the formulation), (b) contacting the softened printable layer and/or adhesive formulation with a gravure sleeve having at least one etched portion wherein the formulation is adsorbed onto the surface of the gravure sleeve, (c) removing excess printable layer from the surface of the gravure sleeve so the printable layer formulation is adsorbed only to the etched portion of the gravure sleeve, and (d) contacting the gravure sleeve with the carrier to deposit the printable layer and/or adhesive formulation onto the carrier, thereby forming a printable layer 20 upon a portion of the carrier 14. An ink layer 22 can then be printed onto the printable layer, and an adhesive layer can then be printed onto the ink layer to form a label having a support portion and a transfer portion. The transfer portion of the label may be subsequently transferred onto an article.

Figure 7:
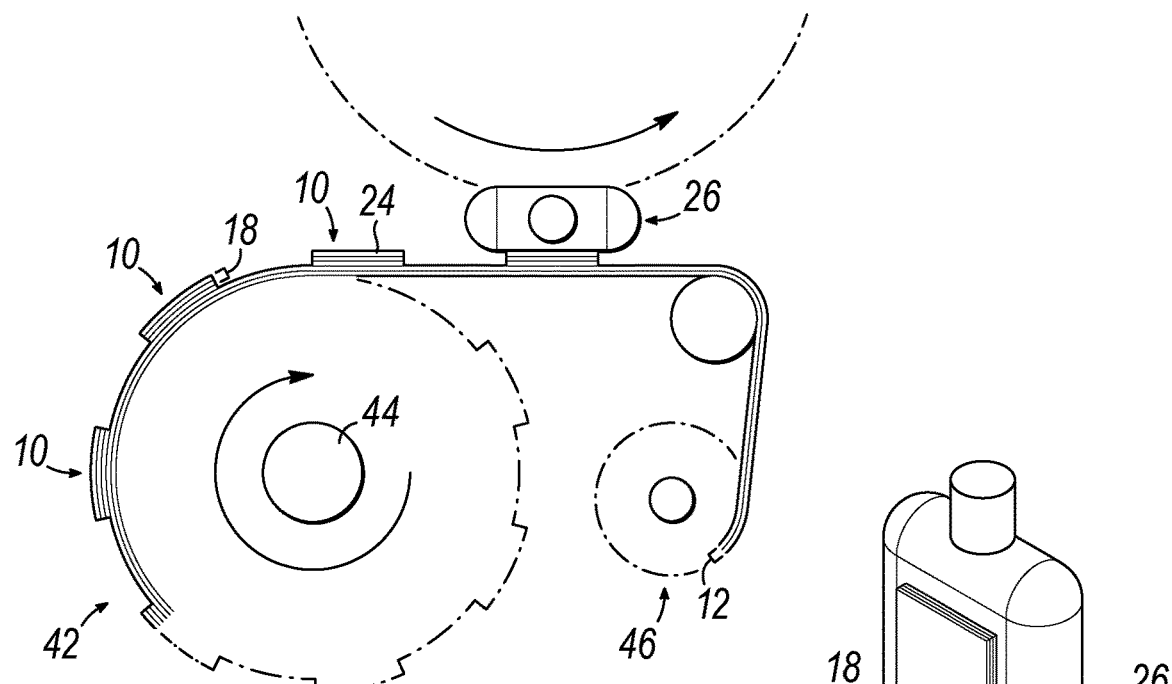
FIG. 7 is a schematic showing application of a pressure sensitive label construction in accordance with principles of the present invention to an article.
Figure 8:
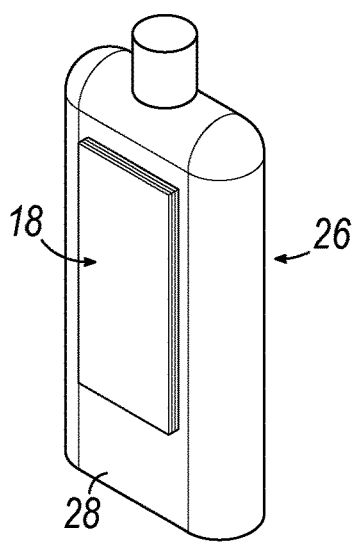
FIG. 8 depicts an article with a pressure sensitive label in accordance with the principles of the present invention associated therewith.

In use, and referring now to FIGS. 7 and 8, the label 10 in accordance with principles of the present invention is applied to an article 26 as follows. In the illustrated embodiment, the labels 10 are carried on a web that has been wound into a roll 42. The transfer portion 18 of the labels 10 are releasable from the support portion 12 (e.g., carrier 14) and the web progresses from a feed reel 44 to a take-up roll 46. After being unwound from the rotating feed reel 44, the web of labels generally will pass proximal to the articles 26 being labeled. It will be recognized by those of skill in the art that the various rolls listed above are merely exemplary, and are not necessary to the principles of the present invention. Upon reaching proximity to the article 26 (see 48 of FIG. 7), contact occurs between the adhesive layer 24 of the transfer portion 18 of the label 10 and a surface of the article 26. At this point, pressure may be applied to adhere the adhesive layer 24 of the label 10 to the surface of the article (by methods and apparatus generally known to those of ordinary skill in the art). This pressure facilitate adherence of the transfer portion of the label 10 to the article 26. After the transfer portion 18 has been applied to an article 26, the bond between the adhesive layer 24 and article is stronger that the releasable bond between the printable layer 20 and carrier 14 (or printable layer 20 and release composition 16—or ink layer 22 and carrier 14). This causes the transfer portion 18 to peel away from the support portion 12 as the web of labels and articles continue to move. The now empty carrier web (i.e., support portion 12) may progress to a take-up reel 46, where it may be recycled (or discarded). It will be recognized by those skilled in the art that the particular number, type, and configuration of components described above are merely illustrative. And after the web has moved past the labeling point, the article 26 (as seen in FIG. 8) now includes the transfer portion 18 of the label adhered thereto.

The application of the label described in this application may occur with the label being rolled onto the article in the same or similar way a heat transfer label would be, which eliminates the opportunity for wrinkles and blisters to occur, thereby reducing and/or eliminating one of the problems with pressure sensitive labels of the prior art.

The embodiments of the present invention recited herein are intended to be merely exemplary and those skilled in the art will be able to make numerous variations and modifications to it without departing from the spirit of the present invention. For example, the particular types of materials used in the adhesive, ink, and protective lacquer layers may be selected to optimize performance of the label, interlayer adhesion, article adhesion, and/or mechanical and chemical resistance suitable for the intended use of the article. Further, the above description may include disclosures of specific materials to use in each individual layers of a label (i.e., a specific ink may be described and so the specification discloses the use of that specific ink, with any carrier, printable layer, and adhesive). However, those descriptions will also be understood by those of skill in the art to include embodiments including the specific material described in each layer of the label (i.e. a specific ink, specific, carrier, specific, printable layer, and specific adhesive described at various locations of the specification will be understood to include a specific embodiment including each of those specific materials). Notwithstanding the above, certain variations and modifications, while producing less than optimal results, may still produce satisfactory results. All such variations and modifications are intended to be within the scope of the present invention as defined by the claims appended hereto.

What is claimed is:

1. A pressure sensitive label comprising:
   (a) a support portion, said support portion including at least a carrier layer; and
   (b) a transfer portion over said support portion for transfer of the transfer portion from the support portion to an article upon application of pressure to the transfer portion while the transfer portion is in contact with the article, said transfer portion including at least
      (1) a clear printable layer in confronting relationship with the carrier layer, the printable layer having a surface to be printed thereon, wherein the printable layer including a resin chosen from vinyl, acrylic, urethane, epoxy, polyester, and alkyd, and
      (2) an ink layer disposed between the printable layer and the carrier layer, wherein the ink layer comprises about 25 wt % to about 35 wt % ethanol, about 20 wt % to about 25 wt % propylene glycol methyl ether, about 15 wt % to about 20 wt % propyl acetate, about 15 wt % to about 20 wt % isopropanol, and about 3 wt % to about 5 wt % aluminum flake.

2. The pressure sensitive label of claim 1, further comprising an adhesive layer positioned such that said printable layer is between said ink layer and said adhesive layer.

3. The pressure sensitive label of claim 1, further comprising a release layer positioned such that said carrier layer is between said ink layer and said release layer.

4. The pressure sensitive label of claim 1, wherein the carrier layer has a surface tension that allows the ink layer to releasably bond thereto.

5. The pressure sensitive label of claim 4, wherein the surface of the carrier layer that contacts the ink layer has a dyne level below about 32.

6. The pressure sensitive label of claim 4, wherein the carrier layer comprises polypropylene.

7. The pressure sensitive label of claim 1, wherein the carrier layer is chosen from plastic film, foil, parchment, and paper.

8. The pressure sensitive label of claim 1, wherein the printable layer is solvent-based, water-based, or ultraviolet curable.

9. The pressure sensitive label of claim 1, wherein the acrylic includes about 30 wt % to about 50 wt % of a triacrylate ester monomer, about 10 wt % to about 12.5 wt % of a diacrylate ester monomer, about 10 wt % to about 12.5 wt % of an aromatic urethane acrylate, about 10 wt % to about 12.5 wt % of a difunctional acrylate, about 5 wt % to about 7 wt % of an acrylate oligomer, about 3 wt % to about 5 wt % of triethanolamine, and about 1 wt % to about 2 wt % of 4-phenylbenzophenone.

10. The pressure sensitive label of claim 2, wherein the adhesive layer comprises about 37.5 wt % to about 80 wt % acrylate, and about 2.5 wt % to about 10 wt % of a photoinitiator.

11. The pressure sensitive label of claim 3, wherein the release layer comprises dimethyl siloxane and silicone.

12. The pressure sensitive label of claim 1, wherein said label does not include any release layer between said carrier layer and said ink layer.

\* \* \* \* \*

UNITED STATES PATENT AND TRADEMARK OFFICE
CERTIFICATE OF CORRECTION

PATENT NO. : 10,650,706 B2
APPLICATION NO. : 16/269943
DATED : May 12, 2020
INVENTOR(S) : Douglas Barnhardt et al.

It is certified that error appears in the above-identified patent and that said Letters Patent is hereby corrected as shown below:

In the Specification

Column 2, Line 12, "etc)" should be --etc.)--.

Column 2, Line 24, "size" should be --size,--.

Column 2, Line 40, "gets" should be --get--.

Column 5, Line 30, "have" should be --having--.

Column 5, Line 67, "transfer portion" should be --transfer portions--.

Column 8, Line 54, "(See," should be --(see,--.

Column 10, Line 29, "12.5 wt % to of a" should be --12.5 wt % of a--.

Column 10, Line 32, "12.5 wt % to of a" should be --12.5 wt % of a--.

Column 15, Line 5, "transfer portion" should be --transfer portions--.

Column 16, Line 25, "etc" should be --etc.--.

Column 17, Lines 38-39, "(and configured into the various desired graphics, text, etc. of the label." should be --(and configured into the various desired graphics, text, etc. of the label).--.

Column 20, Lines 34-35, "The transfer portion 18 of the labels to are releasable" should be --The transfer portion 18 of each label 10 is releasable--.

Column 20, Line 48, "facilitate" should be --facilitates--.

Signed and Sealed this
Twenty-ninth Day of September, 2020

Andrei Iancu
*Director of the United States Patent and Trademark Office*

Column 21, Lines 19-20, "(i.e a specific ink, specific, carrier, specific, printable layer," should be --(i.e., a specific ink, specific carrier, specific printable layer,--.